Feb. 27, 1962

I. I. BESSEN 3,023,311

X-RAY DIFFRACTOMETRY

Filed July 30, 1958

INVENTOR.
IRWIN I. BESSEN
BY

Frank R. Trifari
AGENT.

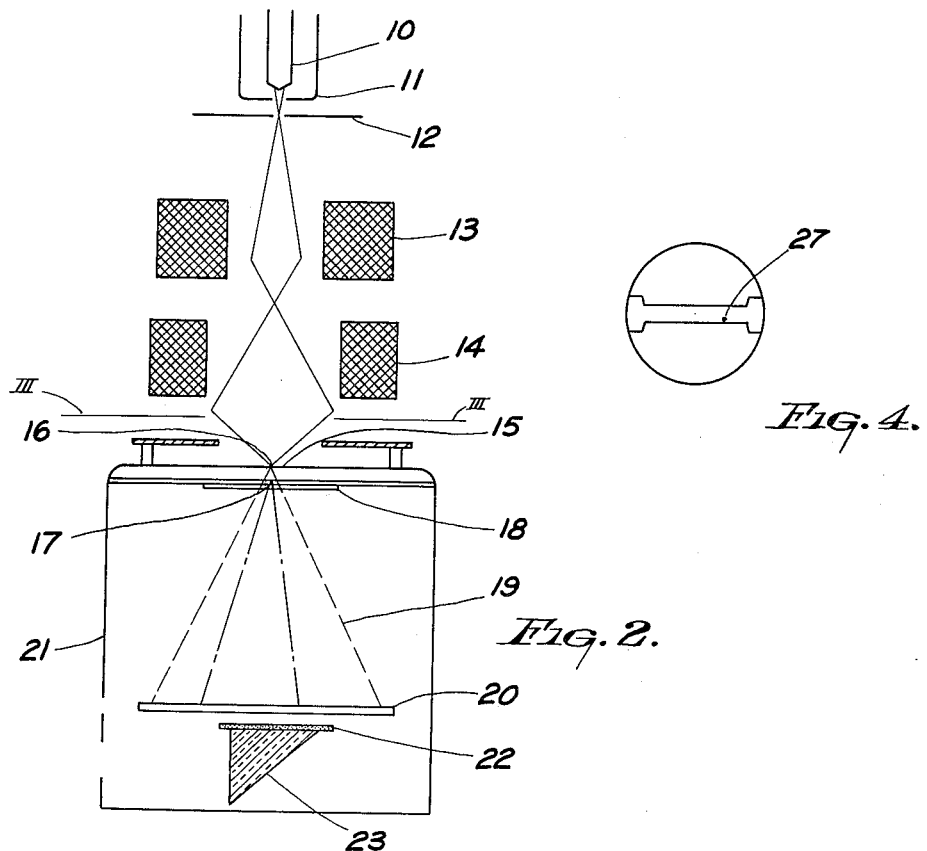
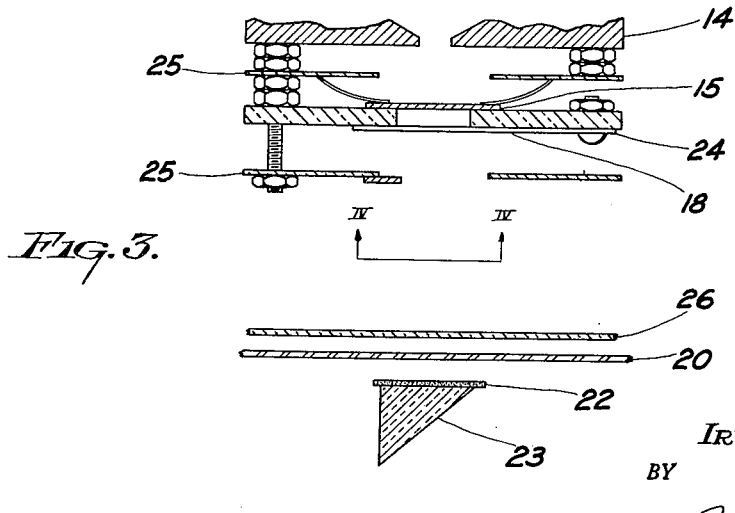

3,023,311
X-RAY DIFFRACTOMETRY
Irwin I. Bessen, New Rochelle, N.Y., assignor to Philips Electronics, Inc., New York, N.Y., a corporation of Delaware
Filed July 30, 1958, Ser. No. 751,942
7 Claims. (Cl. 250—51.5)

My invention relates to X-ray diffractometry or a method of making measurements in crystalline materials with X-rays and to apparatus for making such measurements, particularly as a function of temperature.

It is frequently desirable to obtain information concerning the morphology of a polycrystalline material without reducing the material to a powder or otherwise destroying the sample. While X-ray techniques have been perfected for determining the constituent elements of the sample and its crystalline structure thereby revealing considerable information concerning the constitution of the sample, these techniques reveal very little concerning the physical structure in relation to the morphology of the sample itself. That is to say, the X-ray analytical tools currently available reveal little, if any information, concerning the size, location, and nature of the individual crystallites constituting a polycrystalline material.

It is a principal object of my invention to provide a method for non-destructively determining the physical structure in relation to the morphology of a polycrystalline material.

It is a further object of my invention to provide a method employing X-rays for determining the size of individual crystallites in a polycrystalline material.

It is a still further object of my invention to provide a method employing X-rays for determining the relative population of crystallites in a polycrystalline sample.

It is a still further object of my invention to provide a method employing X-rays for determining the imperfection content of individual crystallites in a polycrystalline material.

And yet another object of my invention is to provide an apparatus for measuring the aforesaid crystallite parameters as a function of temperature.

And still another object of my invention is to provide a means of determining the imperfection content of crystallites under mechanical stress.

These and further objects of my invention will appear as the specification progresses.

Briefly, in accordance with my invention, I expose a polycrystalline sample to a beam of monochromatic X-radiation, diverging from a point source. Since a monochromatic beam of X-radiation striking a crystal will be diffracted by the crystal in accordance with well-known physical laws, a diffracted beam of X-radiation will emerge from the specimen.

If the source of X-radiation has very minute dimensions, even smaller than the size of individual crystallites, the diffracted beams originating from different crystallites are well resolved. Each diffracted beam lies along the surface of a cone whose axis is parallel to the reciprocal lattice vector of the crystallite. Furthermore, the diffracted beam has an angular spread around the surface of the cone (forming a conical triangle) which depends on the size of the crystallite. If this diffracted X-radiation is intercepted by a device capable of converting X-radiation to a visual indication, such as a photographic plate or a fluorescent screen, a series of arcs will be observed which correspond to properly oriented crystals.

Likewise, a series of arcs whose intensity is lower than the general background will appear on the image plane which will hereinafter be referred to as "deficiency arcs." These occur along generators of the diffraction cone which are opposite to the generators along which the diffracted rays lie, and are complementary in intensity to the diffracted beams.

I have unexpectedly found that the dimensions of these deficiency arcs yield valuable information pertaining to the structure of the polycrystalline sample. Thus, I have found that the length of the arc is a measure of the size of a crystallite in the sample irrespective of its morphological position. Consequently, by measuring the lengths of the deficiency arcs so produced, I am able to determine the size and relative positions, which are determined by the location of the deficiency arcs, of crystals in the sample.

I have also found that the number of such arcs indicates the relative number of crystallites in the sample. Thus, while not all crystallites will be properly oriented, a proportional number will be indicated at one time, and a series of measurements made with different orientations of the sample will enable a determination of the number of crystallites in the sample.

Finally, and of considerable importance, is the discovery that the breadth of the arc is a measure of the imperfection content or lattice defects of the crystallites. Thus, if there are any imperfections in any of the crystals due to stress, lattice disorder or the like, the deficiency arc will broaden and the extent of this broadening will be a measure of the imperfection in the crystallite. Known X-ray techniques are incapable of yielding such information on individual crystallites in a polycrystal and in relation to morphology.

A particularly valuable aspect of the latter measurement is the measure of internal strain of the crystallite as the temperature of the sample is increased. In a preferred form of apparatus used in carrying out the method according to the invention, I provide means to heat a sample previously deformed and observe the sharpening of the deficiency arcs thereby determining the kinetics of stress relief and development of perfection in the crystallite and other effects upon the crystallite.

The invention will be described with reference to the accompanying drawing in which:

FIG. 2 is a sectional view of an apparatus according to the invention;

FIG. 3 is a sectional view showing the details below line III—III in FIG. 2; and FIG. 4 is a plan view taken along the line IV—IV in FIG. 3.

Figure 1:
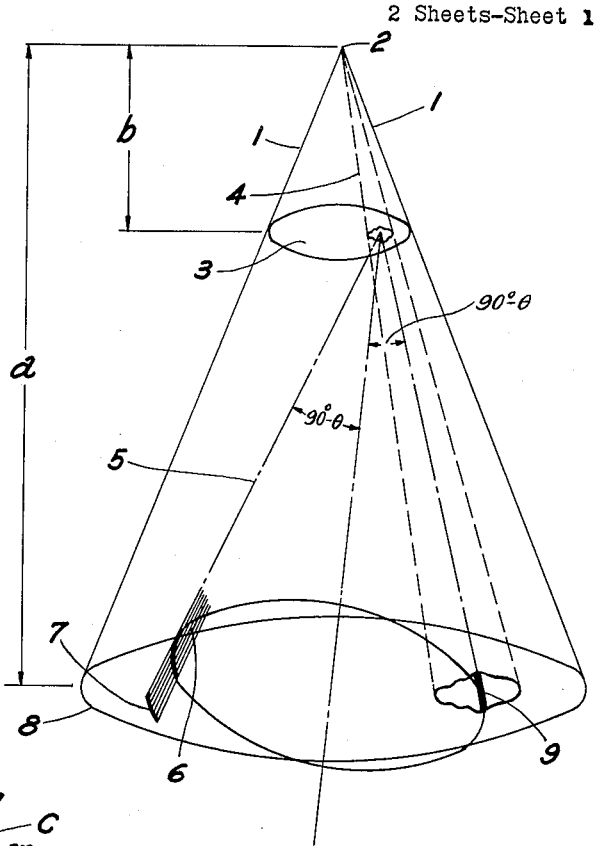
FIG. 1 is a diffraction diagram illustrative of the principles of the invention.

FIG. 1 illustrates the principle underlying the invention. A portion of a beam of monochromatic X-radiation 1 diverging from a point source 2 is intercepted by a polycrystalline sample 3. The diverging cone of rays striking the specimen is absorbed in part giving rise to variations in intensity arising from variations in the mass of the specimen. If the absorption coefficient of the specimen for the radiation used has a high value, a projection X-ray micrograph of high contrast is obtained. However, intensity variations can also arise from X-ray diffraction effects, particularly if the radiation is chosen so that the absorption in the specimen is small. The diffraction occurs when, by chance, certain crystallites of a polycrystalline sample are properly oriented. This occurs when the "reciprocal lattice vector" makes an angle $(90-\theta)$ with the rays projecting through the crystallite from the small source which satisfied the Bragg relation $\lambda = 2d \sin \theta$.

To understand why this occurs it is necessary to conceive of a crystal as built up of atoms and molecules marshalled in definite rows and planes with their mutual forces restraining them to relatively fixed positions in the rigid solid. Since X-rays are scattered by atoms, such a crystal is a three dimensional diffraction grating for X-rays. Consequently, a ray of wavelength λ striking the crystal is reflected by the planes at an angle $(90-\theta)$ relative to the normal to the planes (reciprocal lattice vector) in accordance with the well-known Bragg's law:

$$\lambda = 2d \sin \theta$$

where $d$ is the interplanar spacing.

Figure 1A:
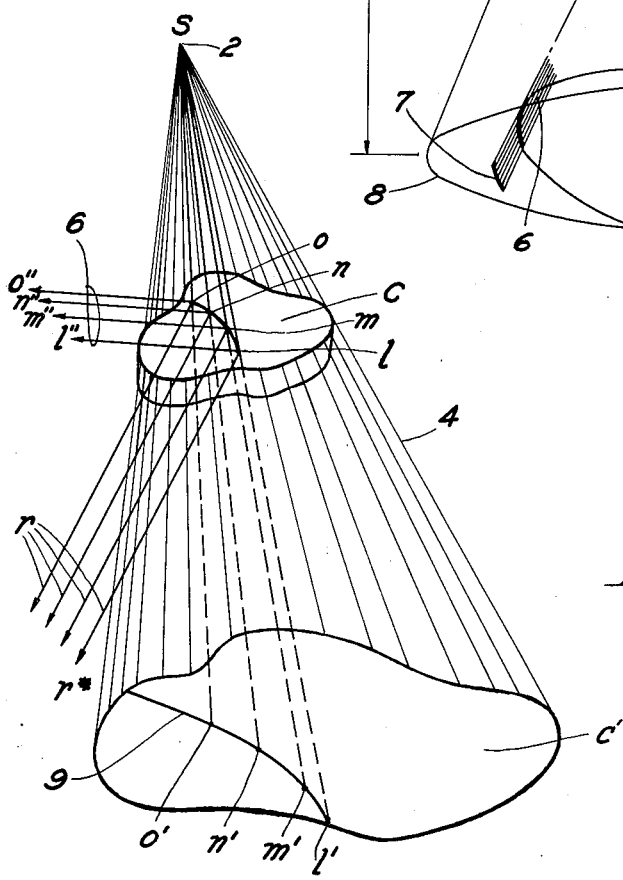
FIG. 1a is a diffraction diagram of a single crystallite obtained in accordance with the invention.

The geometry of the rays and lattice planes is shown in FIG. 1a. The projection of X-rays through the single crystallite C derives from the source S. Let $r$ be the reciprocal lattice vector. A ray such as Sl is capable of being diffracted by crystallite C when the wave-length and angle of incidence are suitable as given by the Bragg law. The diffracted ray Sl'' lies on a locus cone having its apex at $l$, its axis parallel to $r^*$, and its half apex angle equal to $90°-\theta$ where $\theta$ is the grazing angle of incidence of ray Sl on the lattice plane. The diffracted ray Sl'' lies opposite to the phantom projection ll' which is deficient in radiation.

In order to find other points adjacent to $l$, such as $m$, which satisfies the Bragg relation, we must consider points such that the incident rays from S impinge on the crystallite C at the same angle. It is easily seen that the rays that satisfy this condition, such as Sm, Sn, So, etc., lie on the surface of a right circular cone having its apex at S and its axis perpendicular to the lattice planes. The trace of deficiency points, $l'$, $m'$, $n'$, $o'$, etc. forms an enlarged image of the intersection of the circular cone with the image plane. This trace extends completely across the image of the crystallite. The diffracted rays also form an arc which is related to the locus of diffracting points $l, m, n, o$, etc.

A cone 5 along which a diffracted ray from one point of a crystallite lies is shown in FIG. 1 as bounded by the solid lines interrupted by dashes. Since the incident rays that can satisfy the Bragg condition form a portion of a conical surface having its apex at the source and being limited in breadth by the size of the crystallites, the reflections also occur along a surface 6 swept out by a succession of locus cones with apices on the arc lmno. The intersection of these reflections with the image plane 8 forms an arc 7 of high X-ray intensity relative to the general background intensity which has not been diffracted.

Along the projection there is also a complementary loss of intensity along a portion of a conical surface which produces a "definciency arc" 9 on the image plane. The intensity here is lower than that of the general background. Therefore, the deficiency arcs are distinguishable from the reflections.

The deficiency arcs only are related to the crystallite size of the equation $$\text{Arc length} = \text{crystallite size} \times \frac{a}{b}$$

where $b$ is the measured distance between the source and the specimen and $a$ the measured distance between the source and image plane.

Furthermore, the definciency arcs exhibit a broadening when the crystallite is deformed or strained. Thus, by comparing the breadth of the deficiency arc with that obtained in like manner with a perfect crystal, the extent of imperfection in the crystal can be determined.

FIG. 2 shows an apparatus for carrying out the method according to the invention. A beam of electrons generated from a filament 10 surrounded by a biassing cap 11 is accelerated by an anode 12 and focussed by means of a condenser lens 13 and an objective lens 14 on to an X-ray transmission target foil 15 thus generating a virtual point source of monochromatic X-radiation. X-rays diverging from point 16 are intercepted by a polycrystalline sample 17 carried on an insulating support plate 18 for the specimen 17. The emergent beam 19 of X-radiation, a portion of which has been diffracted by properly oriented crystallites in the specimen, is intercepted by a removable photographic plate 20 in a chamber 21. In order to facilitate viewing, the photographic plate may be moved out of the path of the X-rays passing through the specimen which then strike a fluorescent screen 22 converting the X-rays to a visual image which can be observed with a prism 23 for side viewing.

FIG. 3 shows in greater detail a modification of the device particularly adapted to measure the imperfection content of a crystallite as the temperature is varied. An electrical connection 24 is provided to the specimen to heat the same while heat shield 25 protects the remainder of the apparatus from the heat generated. Another heat shield 26 protects the photographic plate.

In order to monitor the temperature of the specimen, a thermocouple 27 is welded to the specimen 17 (FIG. 4).

In operation, a polycrystalline sample is mounted on the specimen support plate and placed in position to be exposed to the cone of monochromatic X-radiation diverging from the point of incidence of the electron beam on target 15. Since in a randomly oriented polycrystalline sample some crystallites will be properly oriented to diffract some of the X-rays, beams of diffracted radiation will emerge from the sample superimposed upon the cone of background radiation provided from the X-ray source. The X-radiation striking the fluorescent screen will form a visual image which can be viewed directly or by means of the prism from the side.

The image will comprise a general background with variations of light intensity corresponding to variations in the intensity of the projected beam of X-radiation which has passed through the sample undiffracted.

The image will also comprise a series of arcs of relatively high intensity superimposed upon the background which are the reflection arcs. A series of arcs of distinctly lower intensity than the general background can also be observed which are the deficiency arcs, the lengths of which are indicative of the crystallite size, the positions of which are indicative of the crystallite positions in the specimen, the number of which are proportional to the crystallite population of the sample and the breadth of which are indicative of the perfection of the crystallites.

Since the image is itself a projection of the sample, it is evident that the length of the deficiency arc is only proportional to the crystallite size and hence the measured length must be multiplied by a proportionality factor corresponding to the magnification of the projected image, or:

$$\text{Size} = \text{measurement} \times \frac{b}{a}$$

An important aspect of the invention is the study of the kinetic rate behaviour of the crystallites under experimental conditions. For that purpose, the instrument is provided with means to heat the sample as shown in detail in FIG. 3. As the temperature increases, process rates for the redistribution of defects in the crystallite increase. This is clearly indicated by a variation in breadth of the deficiency arcs; a microscopic, single crystalline phenomenon not observable by any other analytical technique.

Another important aspect of the invention is the study of the effect of mechanical loading on individual crystallites in a polycrystalline sample. Thus, the sample may be subjected to tensile, compressive, or torsional stress and the redistribution of defects in the crystallites observed by variations in breadth of the deficiency arcs. For example, the instrument hereinbefore described can be provided with members (not illustrated) to engage the sample and apply tensile, compressive or torsional stress. As the stress increases, the variations in strain imparted to the crystallites can be observed by the variations in breadth of the deficiency arcs.

While I have thus described my invention in connection with a specific embodiment thereof, I do not wish to be limited to the precise constructional details illustrated as other variations will be readily apparent to those skilled in the art. The invention both as to its organization and scope is defined in the appended claims which should be as broadly construed as the prior art will permit.

What I claim is:

1. A method of making a structural analysis of a polycrystalline sample lying in a first plane, said method comprising the steps of: exposing the sample to a beam of monochromatic X-radiation diverging from a point source having a cross-sectional area smaller than that of crystallites in the sample and located at a fixed, perpendicular distance "b" from said first plane; intercepting, on a second plane located at a distance "a" from said point source, wherein "a" is the perpendicular distance from said point source to said second plane and "a" is greater than "b," an X-ray image of the sample, including arcs deficient in radiation corresponding to the radiation diffracted by the sample; and measuring the arc length, breadth, and number of the deficiency arcs to determine the size, location, imperfection content, and population of crystallites in the sample, the size of each of said crystallites being $b/a$ times the measured arc length.

2. A method of making a structural analysis of a polycrystalline sample lying in a first plane, said method comprising the steps of: exposing the sample to a beam of monochromatic X-radiation diverging from a point source having a cross-sectional area smaller than that of crystallites in the sample and located at a fixed, perpendicular distance "b" from said first plane; intercepting, on a second plane located at a distance "a" from said point source, wherein "a" is the perpendicular distance from said point source to said second plane and "a" is greater than "b," an X-ray image of the sample, including arcs deficient in radiation corresponding to the radiation diffracted by the sample; and measuring the arc length of the deficiency arcs to determine the size of crystallites in the sample, the size of each of the crystallites being $b/a$ times the measured arc length.

3. A method of making a structural analysis of a polycrystalline sample lying in a first plane, said method comprising the steps of: exposing the sample to a beam of monochromatic X-radiation diverging from a point source having a cross-sectional area smaller than that of crystallites in the sample and located at a fixed, perpendicular distance "b" from said first plane; intercepting, on a second plane located at a distance "a" from said point source, wherein "a" is the perpendicular distance from said point source to said second plane and "a" is greater than "b," an X-ray image of the sample, including arcs deficient in radiation corresponding to the radiation diffracted by said sample; and measuring the breadth of the deficiency arcs to determine the imperfection content of crystallites in the sample.

4. A method of making a structural analysis of a polycrystalline sample lying in a first plane, said method comprising the steps of: exposing the sample to a beam of monochromatic X-radiation diverging from a point source having a cross-sectional area smaller than that of crystallites in the sample and located at a fixed, perpendicular distance "b" from said first plane; intercepting, on a second plane located at a distance "a" from said point source, wherein "a" is the perpendicular distance from said point source to said second plane and "a" is greater than "b," an X-ray image of the sample, including arcs deficient in radiation corresponding to the radiation diffracted by the sample, and counting the number of deficiency arcs to determine the population of crystallites in said sample.

5. A method of making a structural analysis of a polycrystalline sample lying in a first plane, said method comprising the steps of: exposing the sample while subject to stress to a beam of monochromatic X-radiation diverging from a point source having a cross-sectional area smaller than that of crystallites in the sample and located at a fixed, perpendicular distance "b" from said first plane; intercepting, on a second plane located at a distance "a" from said point source, wherein "a" is the perpendicular distance from said point source to said second plane and "a" is greater than "b," an X-ray image of the sample, including arcs deficient in radiation corresponding to the radiation diffracted by the sample, subjecting the sample to stress, and measuring variations in the breadth of the deficiency arcs to determine the variation, with changing stress, of the imperfection content of crystallites in said sample.

6. A method of making a structural analysis of a polycrystalline sample subject to structural transformation and lying in a first plane, said method comprising the steps of: heating said sample to apply heat stress thereto; exposing the sample to a beam of monochromatic X-radiation diverging from a point source having a cross-sectional area smaller than that of crystallites in the sample and located at a fixed, perpendicular distance "b" from said first plane; intercepting, on a second plane located at a distance "a" from said point source, wherein "a" is the perpendicular distance from said point source to said second plane and "a" is greater than "b," an X-ray image of said sample, including arcs deficient in radiation corresponding to the radiation diffracted by the sample, and measuring the arc length, breadth, and number of the deficiency arcs to determine the size, location, imperfection content relative to temperature, and population of crystallites in said sample, the size of each of said crystallites being $b/a$ times the measured arc length.

7. A method of making a structural analysis of a polycrystalline sample subject to structural transformation and lying in a first plane, said method comprising the steps of: applying mechanical stress to the sample; exposing the sample to a beam of monochromatic X-radiation diverging from a point source having a cross-sectional area smaller than that of crystallites in the sample and located at a fixed, perpendicular distance "b" from said first plane; intercepting, on a second plane located at a distance "a" from said point source, wherein "a" is the perpendicular distance from said point source to said second plane and "a" is greater than "b," an X-ray image of said sample, including arcs deficient in radiation corresponding to the radiation diffracted by said sample; and measuring the variation in breadth of the deficiency arcs to determine the changes in imperfection content with changes in stress of crystallies in the sample.

References Cited in the file of this patent

UNITED STATES PATENTS

| | | |
|---|---|---|
| 2,380,236 | Harker | July 10, 1945 |
| 2,417,657 | McLachlan | Mar. 18, 1947 |
| 2,462,374 | Firth | Feb. 22, 1949 |
| 2,814,729 | Newberry et al. | Nov. 26, 1957 |
| 2,819,405 | Bond | Jan. 7, 1958 |

OTHER REFERENCES

"High Temperature X-Ray Diffraction Apparatus," Nat. Bureau of Standards Technical News Bulletin, vol. 31, No. 5, May 1947, pages 59–60.

Cullity: "Elements of X-Ray Diffraction," 1956, pages 496 to 505.